United States Patent
Lisini

(10) Patent No.: US 10,305,317 B2
(45) Date of Patent: May 28, 2019

(54) METHOD AND RELATED SYSTEM FOR TRANSFERRING ELECTRIC ENERGY FROM AN ELECTRIC ENERGY SOURCE TO A LOAD TO BE ELECTRICALLY SUPPLIED

(71) Applicant: Gianni Lisini, Pavia (IT)

(72) Inventor: Gianni Lisini, Pavia (IT)

(*) Notice: Subject to any disclaimer, the term of this patent is extended or adjusted under 35 U.S.C. 154(b) by 328 days.

(21) Appl. No.: 15/324,829

(22) PCT Filed: Jun. 18, 2015

(86) PCT No.: PCT/IB2015/054597
§ 371 (c)(1),
(2) Date: Jan. 9, 2017

(87) PCT Pub. No.: WO2016/005839
PCT Pub. Date: Jan. 14, 2016

(65) Prior Publication Data
US 2017/0201120 A1    Jul. 13, 2017

(30) Foreign Application Priority Data

Jul. 8, 2014 (IT) .............................. MI2014A1248

(51) Int. Cl.
*H02J 7/00* (2006.01)
*H02J 7/34* (2006.01)

(52) U.S. Cl.
CPC ............ *H02J 7/345* (2013.01); *H02J 7/0068* (2013.01); *H02J 7/34* (2013.01); *Y02B 10/30* (2013.01)

(58) Field of Classification Search
CPC . H02J 7/345; H02J 7/0068; H02J 7/34; Y02B 10/30
See application file for complete search history.

(56) References Cited

U.S. PATENT DOCUMENTS

2014/0266289 A1* 9/2014 Della Sera ............. H02S 50/00
324/761.01

FOREIGN PATENT DOCUMENTS

DE        4226529 A1      2/1994
JP        H05292684 A    11/1993

OTHER PUBLICATIONS

Poth, H., International Search Report, PCT/IB2015/054597, dated Aug. 19, 2015, 2 pages.

* cited by examiner

Primary Examiner — Daniel J Cavallari
(74) Attorney, Agent, or Firm — Arent Fox LLP

(57) ABSTRACT

It is described a method and related system for transferring electric energy from an electric energy source to a load to be electrically supplied. The method and related system allow to store electric energy from an electric energy source and supply a load using at least one capacitor and at least one rechargeable battery in which, during the step of charging, the method, related to the availability of the electric supply, can choose to charge sequentially or simultaneously said at least one capacitor and said at least one rechargeable battery. During the step of discharging, the method supplies the load using sequentially electric energy stored in said at least one capacitor and after that in said at least one rechargeable battery.

18 Claims, 11 Drawing Sheets

METHOD AND RELATED SYSTEM FOR TRANSFERRING ELECTRIC ENERGY FROM AN ELECTRIC ENERGY SOURCE TO A LOAD TO BE ELECTRICALLY SUPPLIED

CROSS-REFERENCE TO RELATED APPLICATIONS

This application is the U.S. National Stage Application of International Patent Application No. PCT/IB2015/054597, filed on Jun. 18, 2015, which claims priority to IT Application No. MI2014A001248 filed on Jul. 8, 2014, the contents of each of which is incorporated herein by reference in its entirety.

FIELD OF INVENTION

The present invention refers to a method and a related system for transferring electric energy from an electric energy source to a load to be electrically supplied.

BACKGROUND

There are known techniques of electric energy transfer from an electric energy source (for example, a solar panel) to a load, to be electrically supplied, that employ a Lithium rechargeable battery and a super-capacitor interposed between the electric energy source and the load.

Super-capacitor is typically employed to electrically supply the load during periods in which the solar panel is not able to directly supply the load (for example overnight).

In such electric energy transfer technique, is expected to charge the super-capacitor until reaching a maximum charging threshold value and if afterwards, the solar panel is still able to provide electric energy, it's expected the recharge of the rechargeable Lithium battery.

During the step of discharging, i.e. when the solar panel is not able to directly supply the load, this latter is supplied by transferring electric energy stored in the super-capacitor and, in case that electric energy is not sufficient, the load is also supplied by transferring the electric energy stored in the rechargeable Lithium battery, which, due to the greater capacity in term of energy/volume, can cope with the demand with discharging time significantly longer.

However, such techniques of electric energy transfer shows drawbacks due especially to the optimization of the use of the recharging elements (super-capacitor and Lithium rechargeable battery) involved.

In fact the charge of a Lithium rechargeable battery expects a minimum charging current under which is not possible to get any charge (or the efficiency is significantly low).

Therefore if the achievement of the maximum charging threshold value of the super-capacitor happened in a moment in which the electric current (or anyway the electric energy amount) provided by the solar panel is insufficient for the charge of the Lithium battery, it would lose a portion of the potential energy provided by the solar panel. On the contrary, if that residual electric energy of the solar panel would be allocated to the super-capacitor such electric energy would be recovered.

In the light of this, it's strongly felt the need to define methods for transferring electric energy that are optimized as much as possible when using super-capacitors and rechargeable batteries, in order to take advantage, virtually at most, from the energy provided by the electric energy source, while guaranteeing at the same time affordable cost related to the methodology and the circuitry used in an electric energy transferring technique.

SUMMARY

The object of the present invention is to devise and make available a method for transferring electric energy from an electric energy source to a load which allows at least partially overcoming the drawbacks lamented above with reference to the prior art.

This object is achieved by a method according to claim 1.

Object of the present invention are also a device for transferring electric energy from a supply source to a load to be electrically supplied and a related system comprising such device.

BRIEF DESCRIPTION OF THE DRAWINGS

Further characteristics and advantages of the method, the device and the related system according to the invention will be clearer from the below-reported description of preferred embodiments, given as a non-limiting example with reference to the enclosed figures in which.

DETAILED DESCRIPTION

Figure 1:
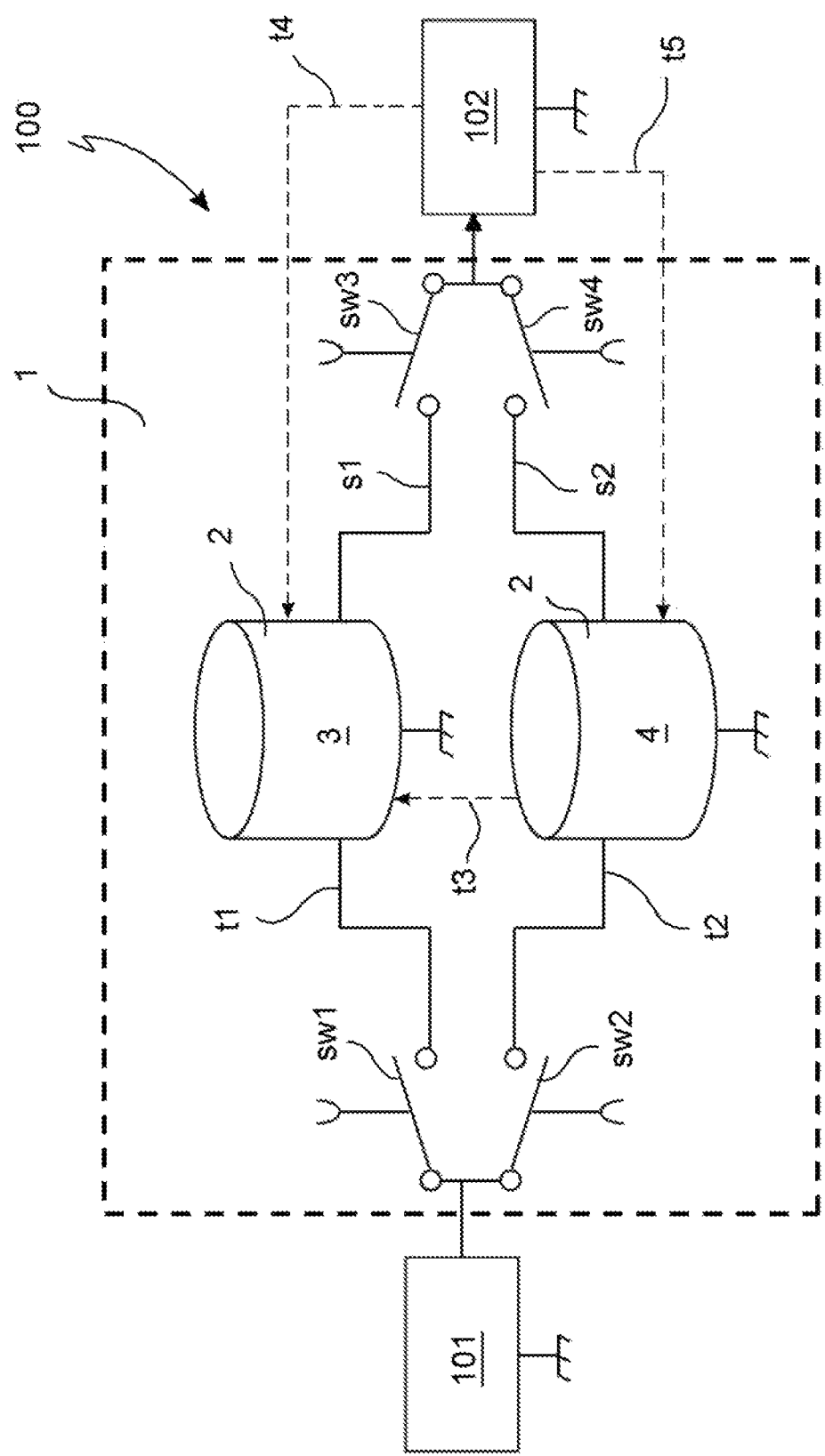
FIG. 1 schematically shows a system for transferring electric energy from an electric energy source to a load, according to an embodiment of the invention.
Figure 2:
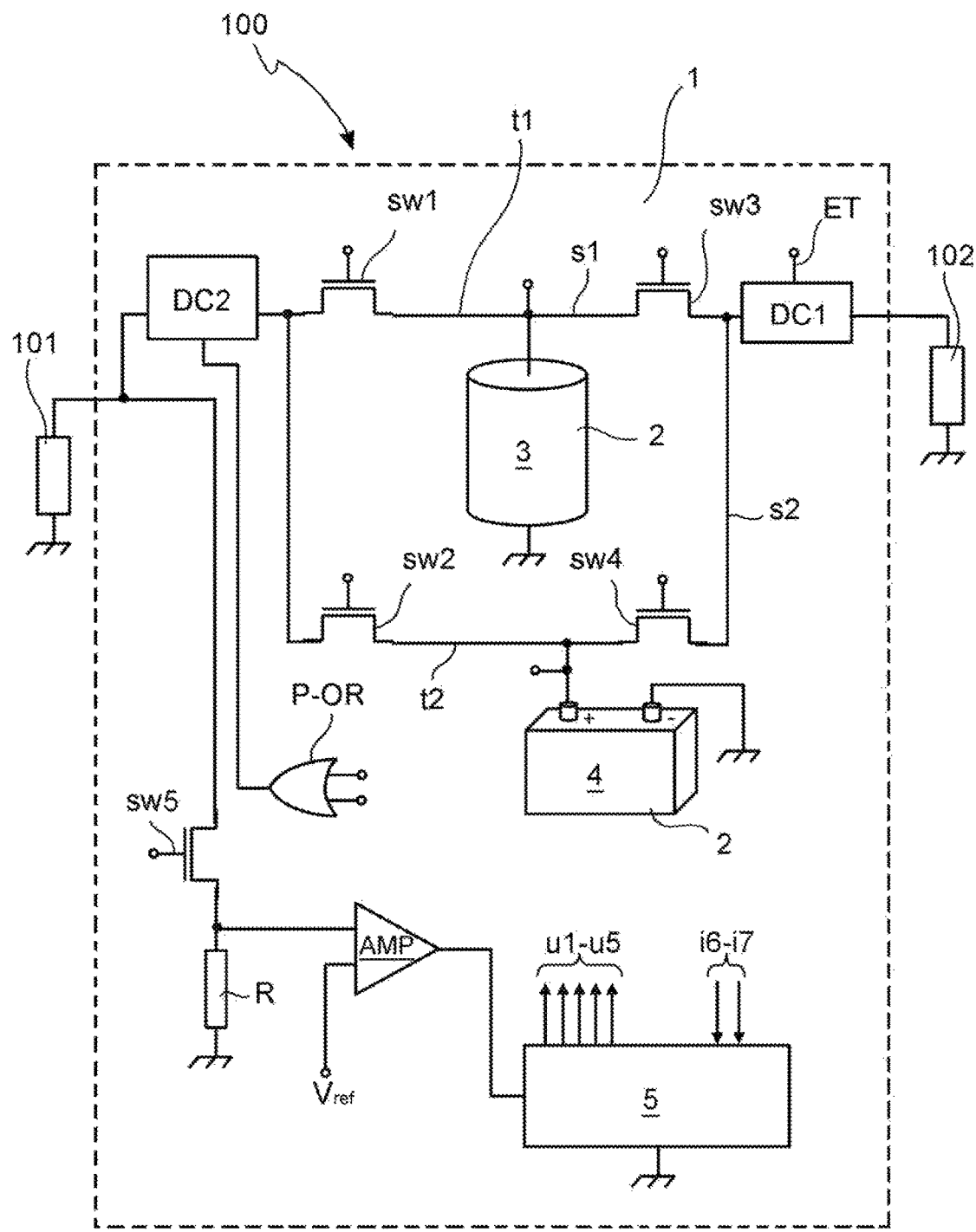
FIG. 2 schematically shows, from a circuital point of view, the system of FIG. 1.

Referring to the FIGS. 1-2, it is now described an system for transferring electric energy from an electric energy source to a load to be electrically supplied, hereafter also called simply system, according to an embodiment of the invention.

The system is indicated in the figures, in its entirety, with the numerical reference 100.

It should be noted that in the drawings equal or similar elements will be indicated with the same numerical or alphanumerical references.

The system 100 comprises an electric energy source 100, hereafter also simply source.

For electric energy source, it is meant any electric energy source like, for example, the ordinary domestic or industrial power supply or other standalone source or a combination thereof, for example, a solar panel, an electric energy accumulator, a thermoelectric generator, an electromagnetic induction electric generator, a turbine or wind turbine, a rotating mass or flywheel (known in English as Flying wheel battery), and so on.

The system 100 also comprises a load 102 to be electrically supplied.

Such load can be an electric network or any electric or electronic apparatus or a combination thereof, including, for example, a photo luminescent element (led, incandescent lamp, laser, and so on), an electric motor, a power tool, an electric accumulator, and so on.

The system 100 also comprises a device for transferring electric energy from the electric energy source 101 to the load 102 (hereafter, for convenience, also simply device).

As it will be described in detail hereinafter, the device 1 is operatively connected to the electric energy source 101 and the load 102.

It should be noted that the typology of the load 102 affects the configuration of the device 1 to be employed and, in some cases, also the typology of electric energy source 101 to be used.

In this regard, some of the applications of the device 1, then possible configurations of the system 100, will be described in the following.

Again with reference to FIGS. 1 and 2, it will be described hereinafter the device 1 for transferring electric energy from the electric energy source 101 to the load 102, according to an embodiment of the invention.

The device 1 comprises a plurality of electric energy accumulators 2 suitable to be interposed between the electric energy source 101 and the load 102.

In more detail, the plurality of electric energy accumulators 2 comprises at least one capacitor 3 and at least one rechargeable battery 4.

To the end of the present description, for capacitor is meant an electric energy accumulator able to support an elevated number of charges/discharges of the electric energy therein storable, i.e. a number of charges/discharges greater than 100.000 charge/discharge cycles without any significant capacity reduction.

According to this definition, examples of capacitors may be: super-capacitor, electrical double layer capacitor EDLC (from the English acronym Electric Double-Layer Capacitor), ultra-capacitor, Lithium capacitor, double layer capacitor, thin film capacitor, Lithium ion hybrid capacitor, ultra-battery, and so on.

Also, to the end of the present description, for rechargeable battery is meant any electric energy rechargeable accumulator. Examples of rechargeable battery are: Lithium accumulator, Lead accumulator, Nickel Cadmium accumulator, Nickel-metal hybrid accumulator (Ni-MH from the English acronym Nickel-MetalHybrid), VanOx accumulator, fuel cell, and so on.

Returning to the embodiment of FIGS. 1 and 2, the device 1 also comprises a first charging electric connection t1 of said at least one capacitor 3 suitable to connect said at least one capacitor 3 to the electric energy source 101.

It should be noted that the first charging electric connection t1 is configured to be open/closed, as will be described in the follow, to allow electric energy transfer from said electric energy source 101 to said at least one capacitor 3.

To this end, in one embodiment, the first electric connection t1 is provided with a first electrical switch sw1, for example, a transistor in MOS technology, as shown in FIG. 2.

In other embodiments, the first electric switch sw1 could be a binary or analog switch or other equivalent device.

According to further embodiments (not shown in the figures), the first charging electric connection t1 may be lacking of an explicit switch and can be open/closed by the use of implicit switches, like ad hoc circuital configurations using diodes or other.

The device 1 also comprises a second charging electric connection t2 of said at least one rechargeable battery 4 suitable to connect said at least one rechargeable battery 4 to the electric energy source 101.

It should be noted that the second charging electric connection t2 is configured to be open/closed, as it will be described in the follow, to transfer electric energy from said at least one electric energy source 101 to said at least one rechargeable battery 4.

To this end, in one embodiment, the second electric connection t2 is provided with a second electric switch sw2, for example, a transistor in MOS technology, as shown in FIG. 2.

In other embodiments, the second electric switch sw2 could be a binary or analog switch or other equivalent device.

According to further embodiments (not shown in figures), the second charging electric connection t2 may be lacking of an explicit switch and can be open/closed by the use of implicit switches, like ad hoc circuital configurations using diodes or other.

The device 1 also comprises a first discharging electric connection s1 of said at least one capacitor 3 suitable to connect said at least one capacitor 3 to the load 102.

It should be noted that the first discharging electric connection s1 is configured to be open/closed for transferring electrical energy from said at least one capacitor 3 to the load 102.

To this end, in one embodiment, the first discharging electric connection s1 is provided with a third electric switch sw3, for example, a transistor in MOS technology, as shown in FIG. 2.

In other embodiments, the third electric switch sw3 may be a binary or analog switch or other equivalent device.

According to further embodiments (not shown in figures), the first discharging electric connection s1 may be lacking of an explicit switch and can be open/closed by the use of implicit switches, like ad hoc circuital configurations using diodes or other.

The device 1 comprises a second discharging electric connection s2 of said at least one rechargeable battery 4 suitable to connect said at least one rechargeable battery 4 to the load 102.

It should be noted that the second discharging electric connection s2 is configured to be open/closed for transferring electric energy from said at least one rechargeable battery 4 to the load 102.

To this end, in one embodiment, the second discharging electric connection s2 is provided with a fourth electric switch sw4, for example, a transistor in MOS technology, as shown in FIG. 2.

According to further embodiments, the fourth electric switch sw4 may be a binary analog circuit breaker (switch) or other equivalent device.

According to further embodiments (not shown in figures), the second discharging electric connection s2 may be lacking of an explicit switch and can be open/closed by the use of implicit switches, like ad hoc circuital configurations using diodes or other.

Returning in general to the device 1, it also comprises a control unit 5 (shown only in FIG. 2) operatively connected to said at least one capacitor 3, to said at least one rechargeable battery 4, to said first charging electric connection t1 (for example, to the first electric switch sw1, in the embodiment of FIG. 1), to said second charging electric connection t2 (for example, to the second electrical switch sw2, in the embodiment of FIG. 1), to said first discharging electric connection s1 (for example, to the third electric switch sw1, in the embodiment of FIG. 1), to said second discharging electric connection s2 (for example, to the fourth electric switch sw4, in the embodiment of FIG. 2).

As shown in the FIG. 2, the control unit 5 is operatively also connected to the electric energy source 101.

To this end of the present description, for control unit 5 it is meant both a programmable control unit, for example a microprocessor or a micro controller, and a not programmable control unit, for example a combinatory logic circuit with electric voltages thresholds, both configured to perform steps of the method for transferring electric energy from the electric energy source 101 to the load 102 according to the present invention, which will be described in the following.

Figure 3:
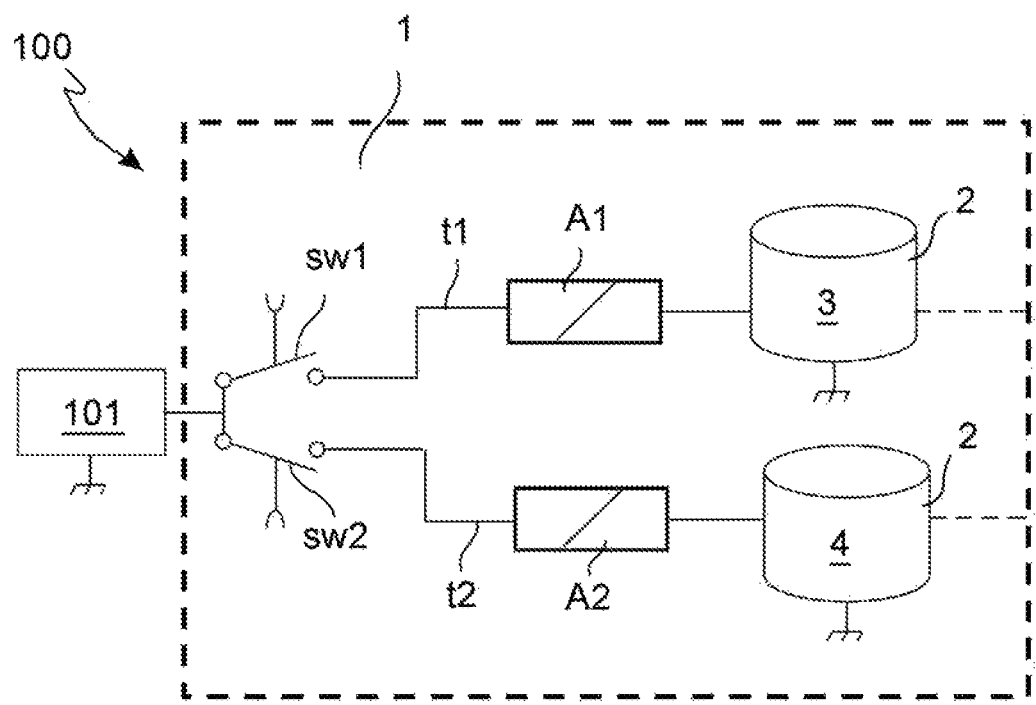
FIG. 3 schematically shows a portion of a system for transferring electric energy from an electric energy source to a load, according to a further embodiment.
Figure 4:
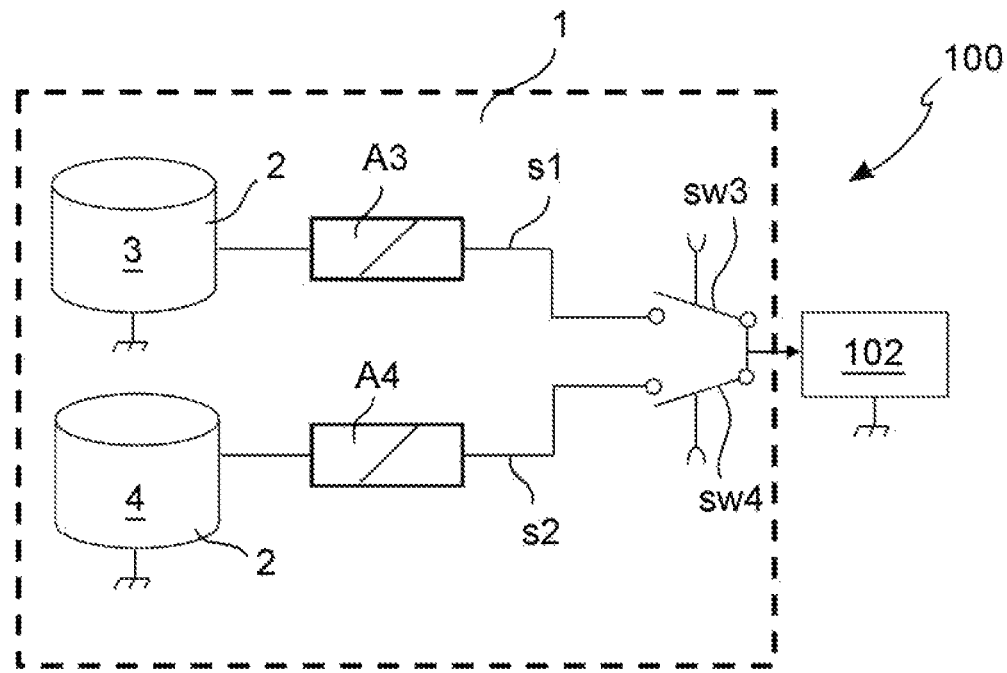
FIG. 4 schematically shows a further portion of a system for transferring electric energy from an electric energy source to a load, according to a further embodiment.

With reference now also to the FIGS. 3 and 4, according to one embodiment, the device 1 also comprises a first electric adapting stage A1 added on the first charging electric connection t1, for example downstream on the first electric switch sw1.

The first electric adapting stage A1 is conveniently configured for adjusting transferable electric energy from the electric energy source 101 to said at least one capacitor 3 on the basis of the typology of recharge of said at least one capacitor 3.

In accordance with different embodiments, the first adapting stage A1, may include, alternatively among them, a DC/DC converter, an AC/DC converter, a passive interface (for example, resistive networks).

In a further embodiment, the first adapting stage A1 may include a MPPT device (from the English acronym Maximum Power Point Tracker), or a device configured for drawing out from "harvesting" electric energy sources typologies ("energy harvesting"), or energy scraped or collected from an alternative energy source, for example a solar panel, the maximum available power (Maximum Power Point) for a specific environment condition (solar irradiance, wind speed, and so on).

In accordance with a further embodiment, always shown in FIG. 3, the device 1 also comprises a second electric adapting stage A2 added on the second charging electric connection t2, for example downstream of the second electric switch sw2.

The second electric adapting stage A2 is configured for adjusting transferable electric energy from the electric energy source 101 to said at least one rechargeable battery 4 on the basis of the recharge typology of said at least one rechargeable battery 4.

In accordance with different embodiments, similarly to the first electric adapting stage A1, the second adapting stage A2 may include, alternatively among them, a DC/DC converter, an AC/DC converter, a passive interface or a MPPT device.

In a further embodiment, alternative to that previously described, the device 1 may comprise a single adapting stage (not shown in figures), placed upstream of the first electric switch sw1 and the second electric switch sw2, configured to implement functions of both the first adapting stage A1 and the second adapting stage A2.

With reference also to the FIG. 4, according to a further embodiment, to be considered alternatively or in combination to that described and shown in FIG. 3, the device 1 also comprises a third electric adapting stage A3 placed on the first discharging electric connection s1, for example upstream of the third electric switch sw3.

The third electric adapting stage A3 is configured to adjust the electric energy transferable from said at least one capacitor 3 to the load 102 on the basis of the typology of the load 102.

In accordance with different embodiments (not shown in the figures), alternatively among them, the third adapting stage A3 may comprise, alternatively among them, a DC/DC converter, an AC/DC converter, a passive interface (for example, resistive networks).

Again with reference to the embodiment of FIG. 4, the device 1 also comprises a fourth electric adapting stage A4 added in the second discharging electric connection s2, for example upstream of the fourth electric switch sw4.

The fourth adapting stage A4 is configured to adjust the electrical energy transferable from said at least one rechargeable battery 4 to the load 102 on the basis of the typology of the load 102.

Similarly to the third electric adapting stage A3, the fourth electric adapting stage A4, in accordance with different embodiments, may include, alternatively among them, a DC/DC converter, an AC/DC converter, a passive interface (for example, resistive networks).

In a further embodiment, alternatively to that described above, the device 1 may comprise a single adapting stage (not shown in the figures), placed downstream of the third electric switch sw3 and the fourth electric switch sw4, configured to implement functions of both third adapting stage A3 and fourth adapting stage A4.

According to a further embodiment, shown with a dotted line in FIG. 1, the device 1 may comprise a third discharging electric connection t3 of said at least one capacitor 3 between said at least one rechargeable battery 4 and at least one capacitor 3.

The third charging electric connection t3, operatively connected and controlled by the control unit 5, as will be also described in the following, allows to transfer electric energy to said at least one capacitor in the event it has transferred to the load 102 all an amount of electric energy reserve previously stored, transferable to the load 102 in the case the load 102 shows transient electric energy absorption greater than an amount of electric energy delivered from said at least one rechargeable battery 4.

It should be noted that the load 102 may, due to its nature, store energy under several forms (kinetic energy, electric energy, thermic energy, and so on). Such stored energy, during the normal operation of the system 100, needs to be dissipated by the load 102 (first of all any kinetic energy of loads such as electrical motors or moving parts). Recovering such energy can contribute positively on the overall energetic balance of the system 100 with the benefit of delaying recharging times of said at least one capacitor 3 and said at least one rechargeable battery 4.

To this end, it has been considered the possibility to recover the energy of the load 102 transferring such energy to said at least one capacitor 3 and, in the case it would not possible to manage the whole power directed to said at least one capacitor 3, transferring the excess amount of power, not manageable by said at least one capacitor 3, to said at least one rechargeable battery 4.

Figure 5:
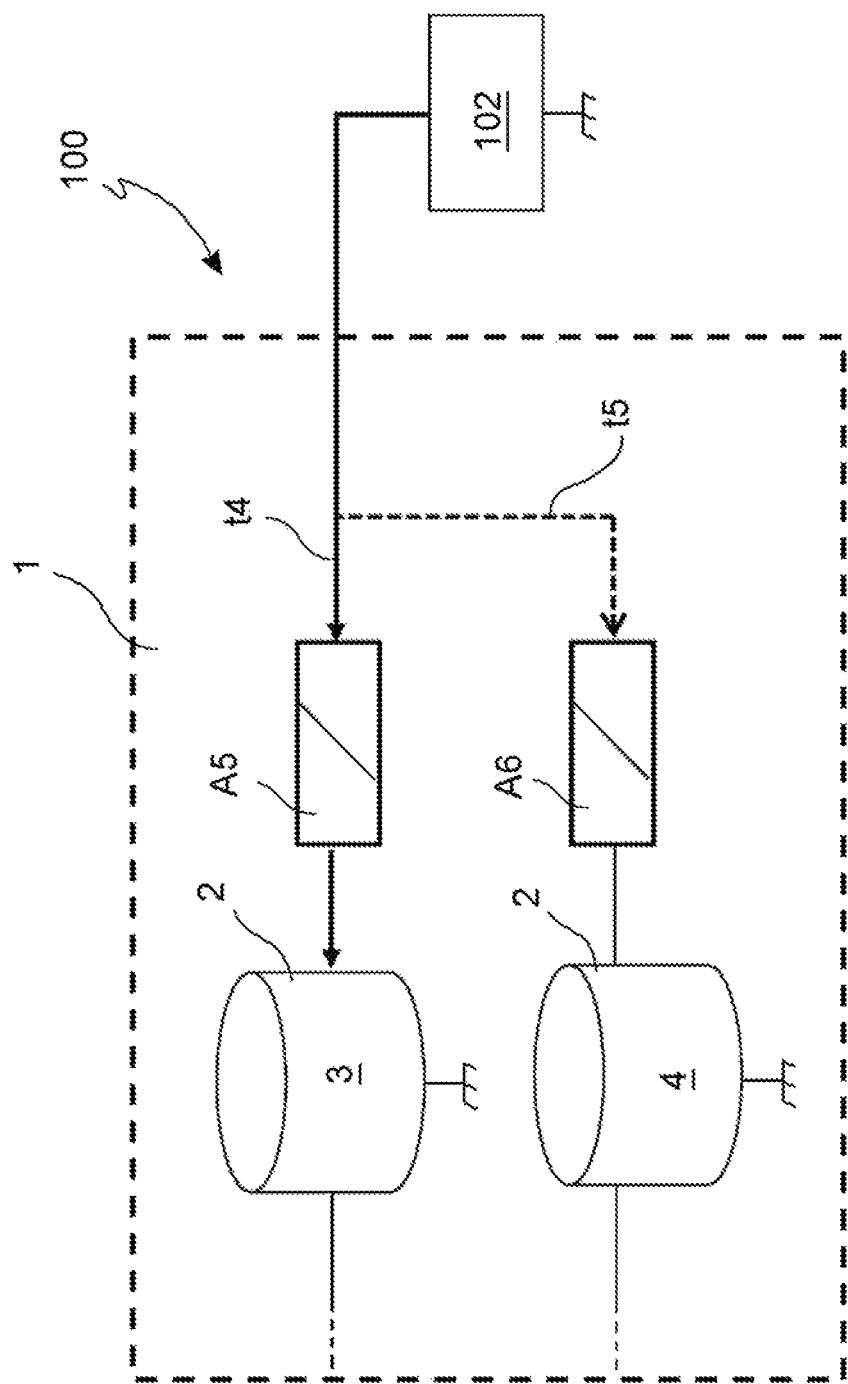
FIG. 5 schematically shows a further portion of a system for transferring electric energy from an electric energy source to a load, according to a further embodiment.

Therefore, referring in particular to the FIG. 5, in accordance with one embodiment, the device 1 also comprises a fourth charging electric connection t4 of said at least one capacitor 3 between the load 102 and said at least one capacitor 3. The fourth charging electric connection t4, operatively connected and controlled by the control unit 5, is suitable to allow the transfer of the energy dissipated by the load 102 to said at least one capacitor 3.

In accordance with the embodiment of the FIG. 5, the device 1 also comprises a fifth adapting stage A5 added in the fourth charging electric connection t4.

The fifth electric adapting stage A5 is configured to adjust the energy dissipated by the load 102 transferable from the load 102 to said at least one capacitor 3 on the basis of the typology of the load 102.

According to another embodiment, the device 1 may be lacking of the fifth electric adapting stage A5.

In accordance with a further embodiment, shown with a dotted line in the FIG. 5, the device 1 may also comprise a fifth charging electric connection t5 of said at least one rechargeable battery 4 between said load 102 and said at least one rechargeable battery 4. The fifth charging electric connection t5, operatively connected and controlled by the control unit 5, is suitable to allow the transfer of energy dissipated by the load 102 to said at least one rechargeable battery 4, in case it would not possible to manage the whole power directed to said at least one capacitor 3.

In accordance with this embodiment (shown in FIG. 5), the device 1 also comprises a sixth electric adapting stage A6 added in the fifth charging electric connection t5.

The sixth electric adapting stage A6 is configured to adjust the energy dissipated by the load 102 transferable from the load 102 to said at least one rechargeable battery 4 on the basis of the typology of said at least one rechargeable battery 4.

In accordance with a further embodiments (not shown in figures), the device 1 may be lacking of the sixth electric adapting stage A6.

Figure 11A:
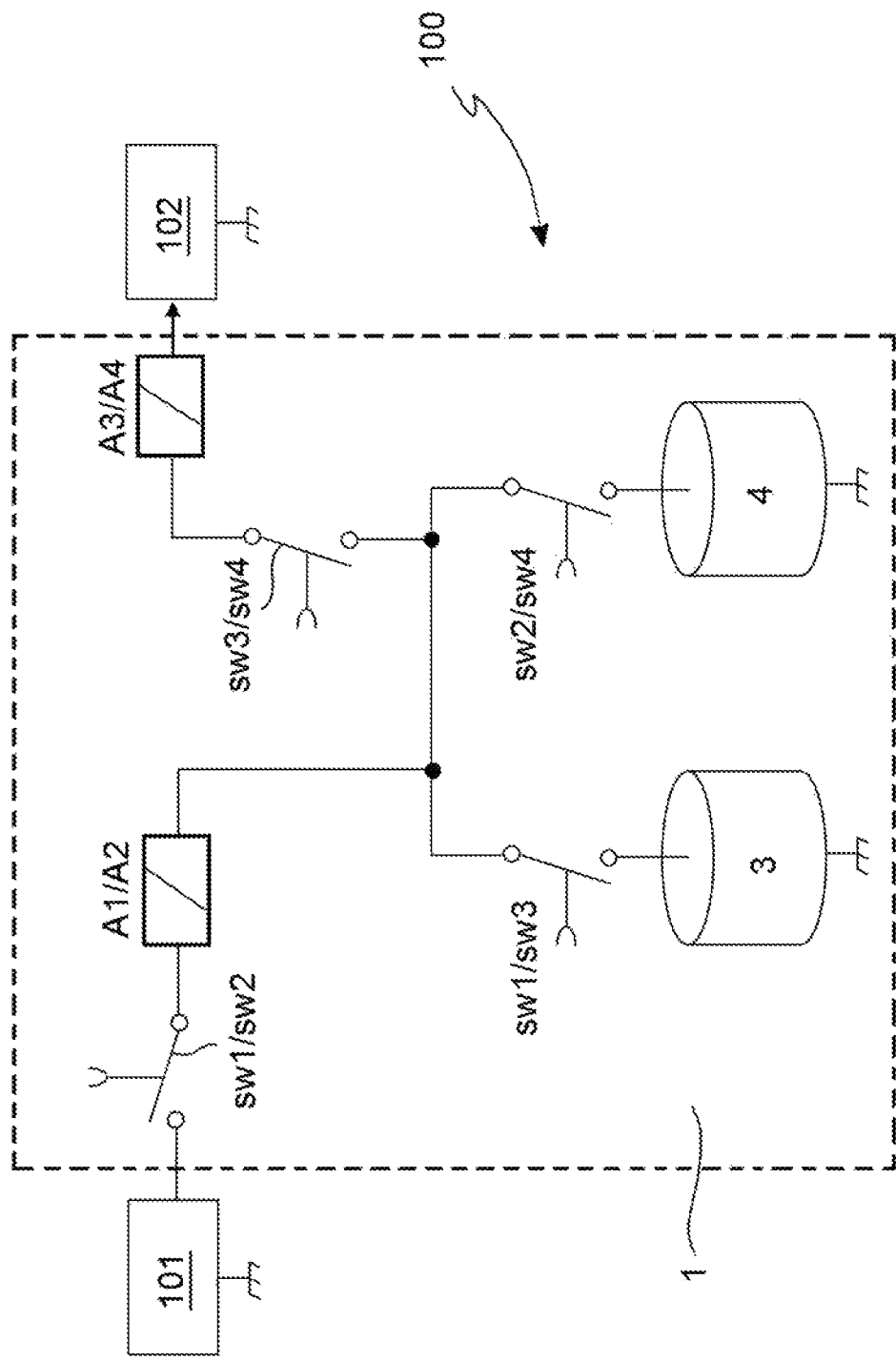
Figure 11B:
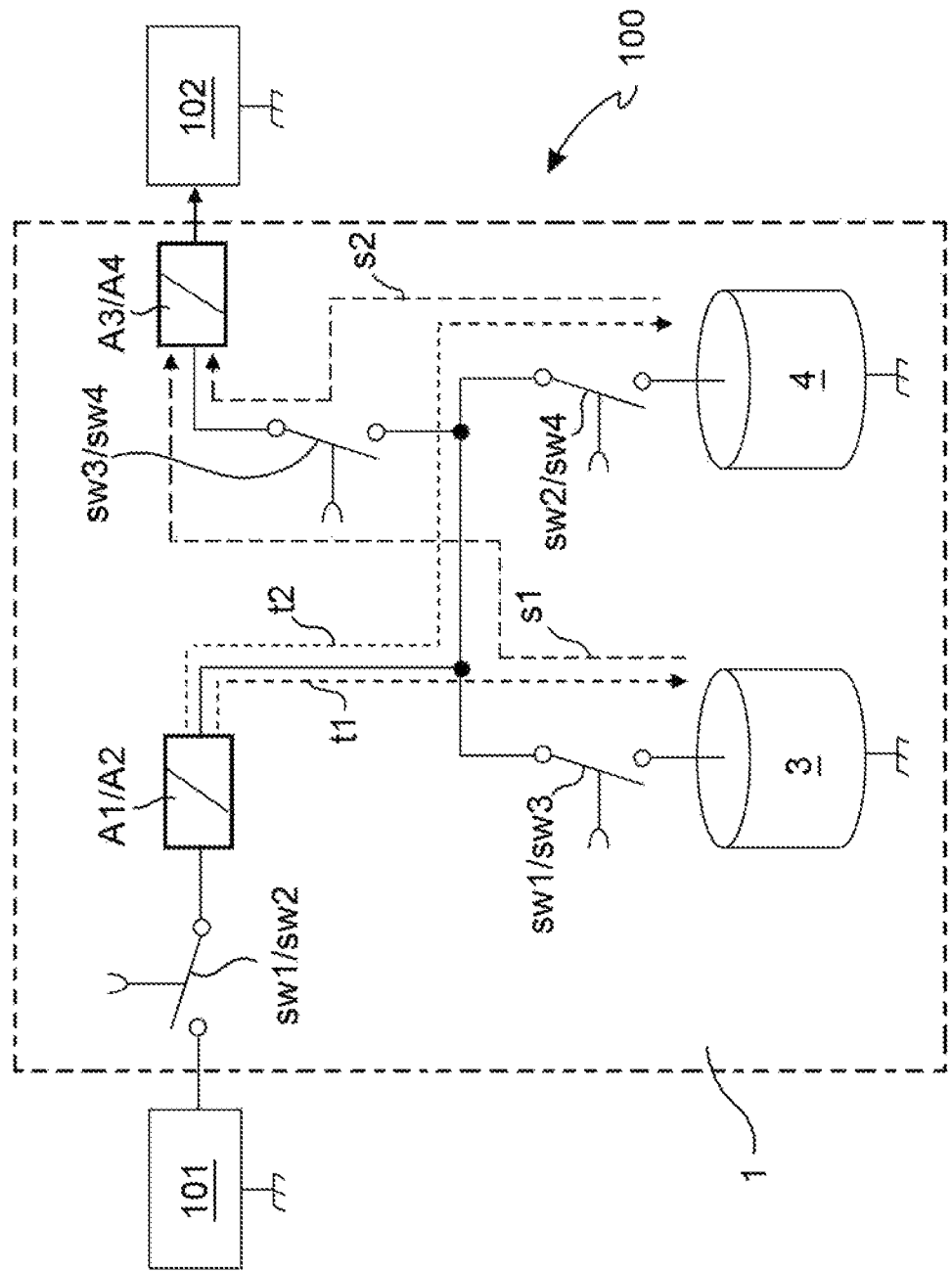

Referring now to the FIGS. 11a and 11b, in accordance with a further embodiment, it should be noted that the first charging electric connection t1 and the second charging electric connection t2 may have, from a circuital point of view, some common sections. In the same way, also the first discharging electric connection s1 and the second discharging electric connection s2 may have, form a circuital point of view, some common sections.

In the above embodiment, the control unit 5, not shown in the FIGS. 11a and 11b, is however configured to enable separately, as in the embodiment of the FIGS. 1 and 2, the first charging electric connection t1 between the source of electric energy 101 and said at least one capacitor 3, the second charging electric connection t2 between said source of electric energy 101 and said at least one rechargeable battery 4, the first discharging electric connection s1 between said at least one capacitor 3 and the load 102, the second discharging electric connection s2 between said at least one rechargeable battery 4 and the load 102. These electric connections are depicted with dotted lines in FIG. 11b.

It should be noted that the enablement of the above electric connections by the control unit 5 may be achieved with any of the above described modality with regards to the embodiments of the FIGS. 1 and 2.

In the specific case of the embodiments of the FIGS. 11a and 11b, the control unit 5 is configured to enable the different electric connections activating electric switches sw1/sw2, sw1/sw3, sw2/sw4 and sw3/sw4 which are provided the above electric connections or the common sections of the above electric connections. One example of arrangement of such electric switches is shown in FIGS. 11a and 11b.

Finally, it should be noted that in the embodiment of FIGS. 11a and 11b, the device 1 comprises, downstream of the electric energy source 101 and the electric switch sw1/sw2, an input adapting stage A1/A2 and, upstream of the load 102, an output adapting stage A3/A4. The input adapting stage A1/A2 and the output adapting stage A3/A4 are similar to one of the adapting stage (A1, A2, A3, A4) previously described with reference to the embodiment of the FIGS. 3 and 4.

It should be noted that the input adapting stage A1/A2 and the output adapting stage A3/A4 may conveniently configured to receive, from the control unit 5, a respective enabling signal.

Referring now to the FIG. 2, it should be noted that, as described above, the management of the device 1 is assigned to the control unit 5, for example a programmable microprocessor (µP) or a combinatory logic circuit with electric voltages threshold (not programmable), in which instructions are stored to execute the method for transferring electric energy from the electric energy source 101 to the load 102 (in particular, the step of recharging and the step of discharging said at least one capacitor 3 and said at least one rechargeable battery), as it will be detailed later.

In the embodiment of FIG. 2, the control unit 5 (microprocessor), through a plurality of outputs u1-u5, is configured to control the electric switches sw1, sw2, sw3, sw4 and also a fifth electric switch sw5, outlined as transistors in MOS technology.

Furthermore, the control unit 5 (microprocessor), through a plurality of inputs i6-i7, is configured to monitor the electric voltage of the terminals of said at least one capacitor 3 and said at least one rechargeable battery 4.

Still with reference to the FIG. 2, the device 1 also comprises an operational amplifier AMP configured to evaluate the power generated in a given time by the electric energy source 101 (for example, solar panel). For that, the control unit 5, closing the switch sw5, shorts the electric current of the solar panel to the ground by a low value resistor R (i.e., a proper value to make almost zero the electric voltage to its terminals, for example lower than 10 ohm) which provides an electrical voltage drop to the input of the operational amplifier AMP proportional to the electric current provided by the electric energy source 101 (solar panel).

Designing properly the resistance value R and the reference voltage Vref imposed at the inverting input of the operational amplifier AMP, is possible to get a threshold comparator suitable to provide a binary signal to the control 5 (microprocessor) as a function of the electric energy (electric current) provided by the electric energy source 101 (for example, a solar panel), therefore, an indication of the electric power deliverable in a given time by the solar panel.

Furthermore, the control unit 5, activating on a regular intervals the fifth electric switch sw5 and verifying the output of the comparator (operational amplifier AMP), is configured to receive an indication of the electric power that can be delivered by the electric energy source 101 (solar panel) and, therefore, execute specific instructions to perform the steps of charging and discharging of said at least one capacitor 3 and said at least one rechargeable battery 4.

Referring again to the FIG. 2, it should be noted that a first DC/DC converter placed upstream of the load 102 is configured to be activated by an external command signal ET ("external trigger") activated in the moment in which is requested the electric supply of the load 102. The first DC/DC converter DC1 is able to provide the electric voltage value or the electric current value suitable to properly electrically supply the load 102 regardless of the electric voltage level of said at least one capacitor 3 or of said at least one rechargeable battery 4.

The logic port OR P-OR is configured to allow the activation of a second converter DC/DC DC2 placed downstream of the electric energy source 101 (solar panel) in relation to the activation of one between said first electric switch sw1 and said second electric switch sw2.

Figure 6:
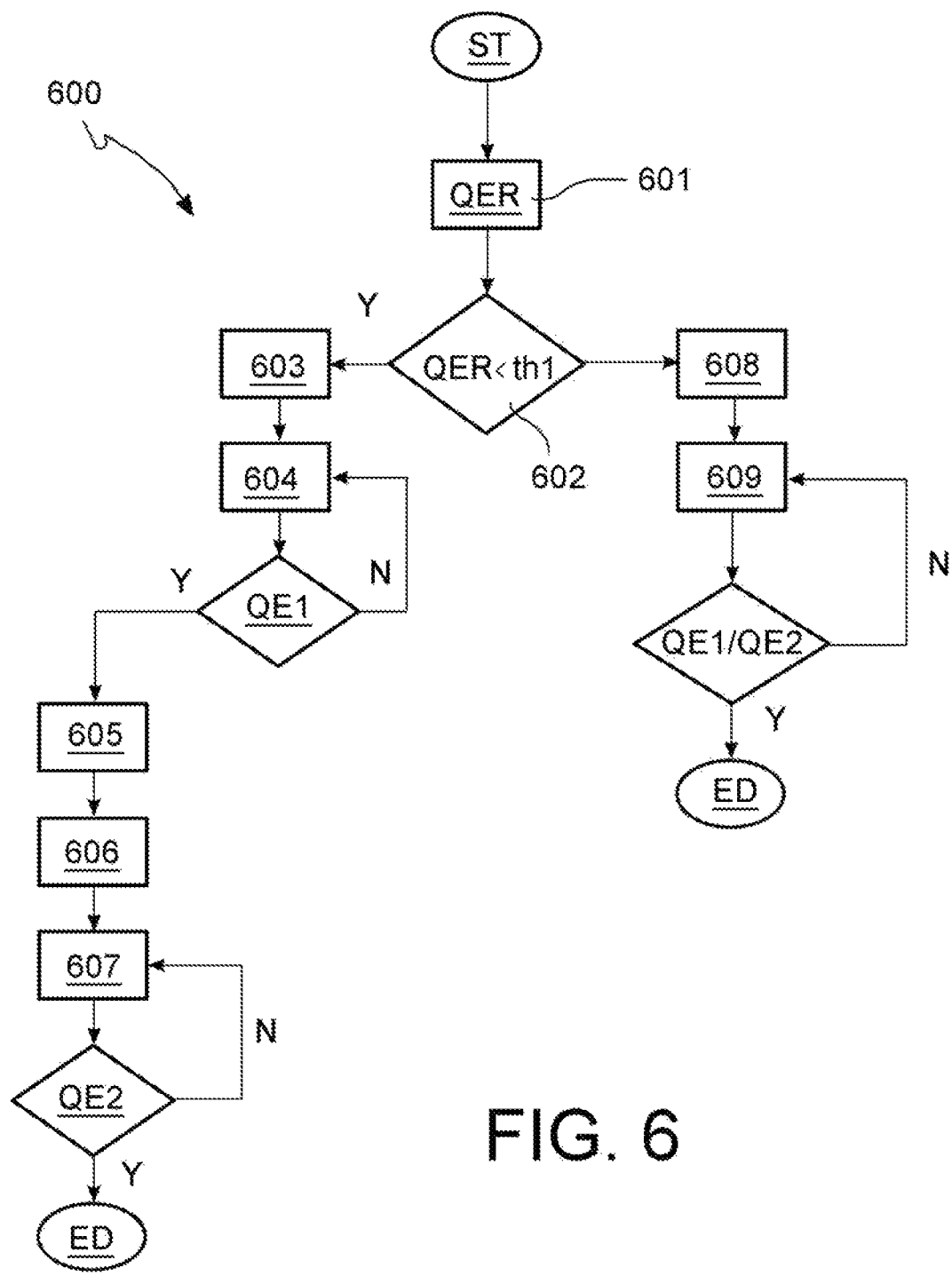
FIG. 6 schematically shows through a block diagram a first part of the method for transferring electric energy from an electric energy source to a load, according to an embodiment of the invention.
Figure 7:
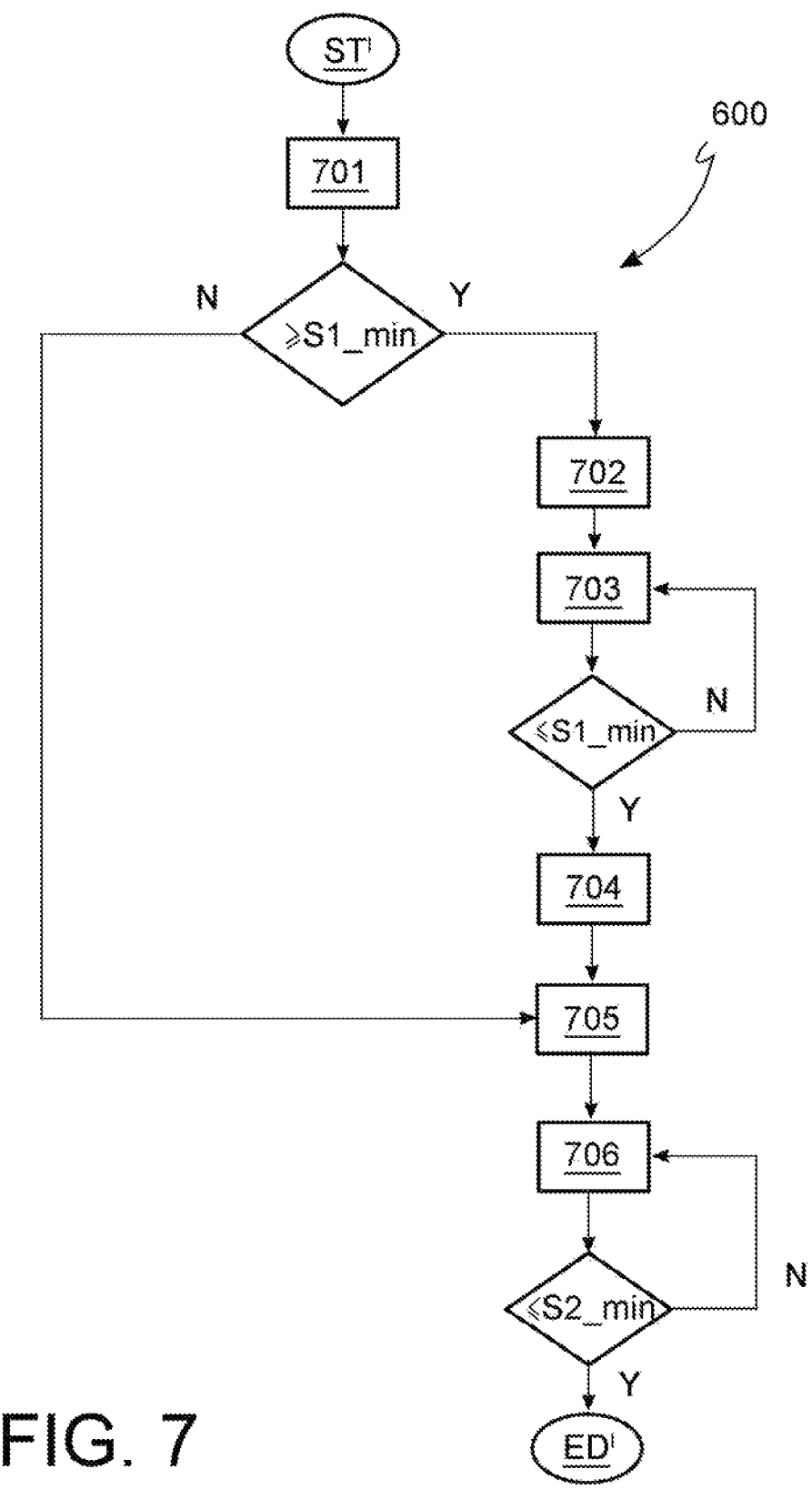
FIG. 7 schematically shows, through a block diagram a second part of the method for transferring electric energy, according to the embodiment of FIG. 6.

Referring now to the system 100 described above and to the block diagram of the FIG. 6 and of the FIG. 7, it is now described a method for transferring electric energy, specified as whole with the numeric reference 600, from the electric energy source 101 to the load 102 by means of a plurality of electric energy accumulator 2 interposed between the electric energy source 101 and the load 102, that is through the use of the device 1.

As previously described, it is recalled that the plurality of electric energy accumulators 2 comprises at least one capacitor 3 and at least one rechargeable battery 4. Examples of said at least one capacitor 3 and said at least one rechargeable battery 4 have been shown previously.

Referring to the FIGS. 6 and 7, in accordance with one embodiment, the method 600 for transferring electric energy, hereafter also simply method 600, comprises a symbolic step of starting ST.

Furthermore, the method 600 includes a step of detecting 601, by the control unit 5, a value QER representative of the amount of electric energy that can be delivered by the electric energy source 101.

To the end of this description for "electric energy that can be delivered" is meant both the amount of electric energy being delivered by the electric energy source 101 and the quantity of the electric energy detectable by the electric energy source even when the electric energy source is not yet supplying electric energy (the detection may take place, for example, by the detection of the no-load electric voltage).

It should be noted that the representative value of the amount of the electric energy that can be delivered by the electric energy source 101 may also be provided by a detection not executed directly on the electric energy source 101, that is executed by, for example:
a sensor of brightness whose output is likely proportional to the electric current provided by an electric energy source represented, for example, by a solar panel;
a different input of the electric supply, or different connectors in case there were two separate inputs at different power to supply the device 1,
an electronic device configured to indicate to the control unit 5 the availability of electric current the electric supply can provide.

Furthermore, always to the aim of this description, for amount of electric energy that can be delivered by the electric energy source 101 is meant every measurable electric quantity like, for example, the delivered electric current, the no-load voltage, the ratio between the electric voltage and the electric current related to the load level, and so on.

Returning to the method 600, it also comprises a step of comparing 602, by the control unit 5, the detected value QER representative of the amount of electric energy that can be delivered by the electric energy source 101 with a set first electric energy amount reference value th1.

In more detail, it should be noted that the set first electric energy amount reference value th1, in accordance with one embodiment, is as a function of the at least one set first electric energy amount threshold value, for example of electric current. This embodiment concerns applications of the system 100 in which the load 102 would be a so called low current device (for example, electric current lower than 1 Ampere), or, for example, wireless typology detection devices (wireless sensors device), bright markers, and so on.

According to a further embodiment, alternatively or in combination to the previous one, it should be noted that the set first electric energy amount reference value th1 is also as a function of a set second electric energy amount threshold value manageable by an adapting stage assigned to the charging of said at least one capacitor 3. This embodiment concerns applications of the system 100 in which the load 102 is an high current device (for example, electric current greater than 1 Ampere), or, for example, electric vehicles, power tools, solar panel generators and so on.

It should be noted that for "also as a function of a set second electric energy amount threshold value" is meant, for example:
value of electric voltage measured by the bench of one or more super-capacitors;
value of electric charge measured by the bench of one or more super-capacitors;
value of electric current measured through the DC/DC converter inductance (if present);
value of electric current measured through one or more wings of the DC/DC converter (if present);
duty-cycle value of the DC/DC converter (if present);
value of the frequency used by the DC/DC converter (if present);
saturation value of the magnetic field of the DC/DC transformer (if present);
one or more electrical signals provided by the control unit 5 configured for the charging of said at least one capacitor 3;
temperature reached by a DC/DC converter, for example the first adapting stage A1 and/or the second adapting stage A2, assigned to the charging of said at least one capacitor 3.

According to a further embodiment, alternatively or in combination to these described above, the set first electric energy amount reference value is also as a function of a set electric charge threshold value of said at least one capacitor 3.

Referring now to the embodiment of FIG. 6, in case the detected value QER representative of the electric energy amount delivered by the electric energy source 101 is lower than said set first electric energy amount reference value th1 (Y), the method 600 comprises steps of:
enabling 603, by the control unit 5, the first charging electric connection t1 between the electric energy source 101 and said at least one capacitor 3;
delivering 604 electric energy to said at least one capacitor 3 until it reaches a set first electric energy charge value QE1 (N);
once the electric energy accumulated by said at least one capacitor 3 has reached that set first electric energy charge value QE1 (Y):
disabling 605, by the control unit 5, the first charging electric connection t1;
enabling 606, by the control unit 5, the second charging electric connection t2 between the electric energy source 101 and said at least one rechargeable battery 4, transferring 607 electric energy to said at least one rechargeable battery 4 until reaching a set second electric energy charge value QE2 (N).

Once reaching the set second electric energy charge value QE2 (Y), the method 600, at this point, ends with a symbolic step of ending ED.

In the case that the detected value QER representative of the electric energy amount that can be delivered by the electric energy source 101 is greater than said a set first electric energy amount reference value th1 (N), the method 600 comprises steps of:

enabling 608, by the control unit 5, the first charging electric connection t1 between the electric energy source 101 and said at least one capacitor 3 and/or the second charging electric connection t2 between the electric energy source 101 and said at least one rechargeable battery 4;

transferring 609 electric energy, respectively, to said at least one capacitor 3 until reaching the set first electric energy charge value QE1 and/or to said at least one rechargeable battery 4 until reaching a set second electric energy charge value QE2.

Once the set first electric energy charge value QE1 (Y) and/or said at least one rechargeable battery 4 has reached the set second electric energy charge value QE2 (Y), the method 600 ends with a step of ending ED.

It should be noted that the portion of the method 600 descried with reference to the block diagram of FIG. 6 is representative of the step of charging executable with the device 1, described above.

Referring also to the block diagram of FIG. 7, the method 600 also comprises a symbolic step of further starting ST'.

In addition, the method 600 comprises a step of comparing 701, by the control unit 5, the charging level of said at least one capacitor 3 with a set first reference threshold value S1_min. It should be noted that the set first reference threshold value S1_min corresponds to the minimum charging level of said at least one capacitor 3 suitable to provide energy to the load 102.

In the case that said charging level of said at least one capacitor 3 is greater than said set first reference threshold value S1_min (Y), the method 600 comprises steps of:

enabling 702, by the control unit 5, the first discharging electrical connection s1 between said at least one capacitor 3 and said load 102;

transferring 703 electric energy from said at least one capacitor 3 to the load 102 until the charging level of said at least one capacitor 3 is greater than said set first reference threshold value S1_min (N).

In the case that the charging level of said at least one capacitor 3 has reached the set first reference threshold value S1_min (Y), the method 600 comprises steps of:

disabling 704, by the control unit 5, the first discharging electric connection s1;

enabling 705, by the control unit 5, the second discharging electrical connection s2 between said at least one rechargeable battery 4 and the load 102;

transferring 706 electric energy from said at least one rechargeable battery 4 to the load 102 until the charging level of said at least one rechargeable battery 4 is greater than said set second reference threshold value S2_min (N).

It should be noted that the set second reference threshold value S2_min corresponds to the minimum charging level of said at least one rechargeable battery 4 suitable to provide energy to the load 102.

Once the electric energy transferred from said at least one rechargeable battery 4 to the load 102 has reached the set second reference threshold value S2_min (Y), the method 600 ends with a further symbolic step of ending ED'.

In the event that the charging level of said at least one capacitor 3 is lower than said set first reference threshold value S1_min (N), the method 600 comprises steps, already described above:

enabling 705, by the control unit 5, the second discharging electrical connection s2 between said at least one rechargeable battery 4 and the load 102;

transferring 706 electric energy from said at least one rechargeable battery 4 to the load 102 until the charging level of said at least one rechargeable battery 4 is greater than said set second reference threshold value S2_min (N).

Even in this case, once the electric energy transferred from said at least one rechargeable battery 4 to the load 102 has reached the set second reference threshold value S2_min (Y), the method 600 ends with a further symbolic step of ending ED'.

It should be noted that the portion of the method 600 described with reference to the block diagram of FIG. 7, is representative of the step of discharging executable with the device 1, described above.

In accordance with a further embodiment, not shown in the figures, in the case that the detected value QER representative of the electric energy amount that can be delivered by the electric energy source 101 is lower than said set first electric energy amount reference value th1 and is greater than said set second electric energy amount threshold value manageable by an adapting stage for charging of said at least one capacitor 3, the method 600 also includes a possible step of providing, by the control unit 5, at least one electric energy amount excess part to said at least one rechargeable battery 4. In fact, the electric energy amount excess part manageable by an adapting stage used for charging said at least one capacitor 3 may be provided (totally or partially) to said at least one rechargeable battery 4, or not used.

In accordance with a further embodiment, alternatively to that described before, also not shown in figures, in the case that the detected value QER representative of the electric energy amount that can be delivered by the electric energy source 101 is greater than the set first electric energy amount reference value th1, the method 600 may comprise steps of:

enabling, by the control unit 5, the first charging electrical connection t1 between the electric energy source 101 and said at least one capacitor 3 and the second charging electric connection t2 between the electric energy source 101 and said at least one rechargeable battery 4;

transferring, by the control unit 5, electric energy, respectively, to said at least one capacitor 3 until reaching the set first electric energy charge value QE1, and to said at least one rechargeable battery 4 until reaching the set second electric energy charge value QE2.

In more detail, the above step of transferring electric energy to said at least one capacitor 3 and to said one rechargeable battery 4 also includes a step of distributing, by the control unit 5, the energy delivered by the electric energy source 101 in equal or different parts between said at least one capacitor 3 and said at least one rechargeable battery, as a function of the charging level of said at least one capacitor 3 or said at least one rechargeable battery 4 or a combination thereof.

According to this embodiment, the step of transferring electric energy to said at least one capacitor 3 or to said at least one rechargeable battery 4 also includes a step of transferring, by the control unit 5, the whole energy delivered by the electric source 101 to said at least one capacitor 3 or to said at least one rechargeable battery 4 as a function of the charging level of said at least one capacitor 3 or said at least one rechargeable battery 4 or a combination thereof.

In accordance with a further embodiment, not shown in figures, in the case that the detected value QER representative of the electric energy amount that can be delivered by the electric energy source 101 is greater than said set first electric energy amount reference value, the method 600 comprises steps of:
- enabling, by the control unit 5, the second charging electric connection t2 between the electric energy source 101 and said at least one rechargeable battery 4;
- transferring electric energy to said at least one rechargeable battery 4 until reaching a set second electric energy charge value QE2;
- subsequently, enabling, by the control unit 5, the first charging electric connection t1 between the electric energy source 101 and said at least one capacitor 3;
- transferring, by the control unit 5, electric energy to said at least one capacitor 3 until reaching a set first electric energy charge value QE1.

In accordance with a further embodiment, not shown in figures, in the case that the detected value QER representative of the electric energy that can be delivered by the electric energy source 101 is greater than said set first energy amount reference value th1, the method 600 comprise steps of:
- enabling, by the control unit 5, the first charging electric connection t1 between the electric energy source 101 and said at least one capacitor 3 or the second charging electric connection t2 between the electric energy source 101 and said at least one rechargeable battery 4;
- transferring in an alternated manner, by the control unit 5, electric energy, respectively, to said at least one capacitor 3 until reaching a set first electric energy charge value QE1 or to said at least one rechargeable battery 4 until reaching a set second electric energy charge value QE2, as a function of a set equal or different temporization.

In accordance with this embodiment, the method 600 also comprises a step of establishing, by the control unit 5, the set temporization as a function of the charging status of said at least one capacitor 3 or said at least one rechargeable battery 4 or a combination thereof.

According to a further embodiment, in combination with any of those previously described, the method 600 also comprises a step of detecting, by the control unit 5, the time duration of the availability of electric energy provided by the electric source 101.

In accordance with a further embodiment, in combination with any of those previously described, in the case that the electric energy is transferred from said at least one rechargeable battery 4 to said load 102 and the load 102 shows electric energy absorbing transients greater than an electric energy amount that can be delivered by said at least one rechargeable battery, the method 600 may advantageously comprises steps of:
- enabling, by the control unit 5, the first discharging electric connection s1 of said at least one capacitor 3 between said at least one capacitor and said load 102;
- transferring from said at least one capacitor 3 to said load 102 a set amount of reserve electric energy previously stored in said at least one capacitor 3.

Furthermore, in case the set amount of reserve electric energy previously stored in said at least one capacitor 3 transferred to said load 102 is consumed, the method 600 comprises steps of:
- enabling, by the control unit 5, a third charging electric connection t3 of said at least one capacitor 3 between said at least one rechargeable battery and said at least one capacitor 3;
- transferring electric energy from said at least one rechargeable battery 4 to said at least one capacitor 3 until reaching said set amount of reserve electric energy previously stored in said at least one capacitor 3.

According to a further embodiment, to be considered in combination to any of the embodiments described above, the method 600 also comprises steps of:
- detecting, by the control unit 5, the electric energy that can be dissipated by the load 102;
- enabling, by the control unit 5, a fourth charging electric connection t4 of said at least one capacitor 3 between said load 102 and said at least one capacitor 3;
- transferring, by the control unit 5, said electric energy that can be dissipated by the load 102 from said load 102 to said at least one capacitor 3.

Object of this invention is also a program product (instructions code) loadable in a memory unit of an electric calculator (for example the control unit 5, in the case it is a microprocessor or a programmable micro controller) and executable by the control unit 5 to perform the steps of the method according to the different embodiments previously described.

Some examples of use of the method 600 and the related system 100, in accordance with different embodiments, are now described, also in order to highlight their advantages.

Use for Detection Devices in Wireless Technology (Wireless Sensors)

Detection devices in wireless technology (so called wireless sensors) comprise devices or more in general systems configured for elaborating, transmitting and receiving information with the possibility to be independent from an external electric energy source (power supply source).

Most of these devices or systems are supplied by "harvesting" generators like solar panels, thermo-electrical generators, wind turbines, piezoelectric generators, acoustic wave generators, via electromagnetic waves, and so on.

In most cases the powers involved are sub-watt and the dimensions particularly reduced.

Since not always the energy of the electric energy source (primarily, of the solar panels) is always available, in order to allow a normal operation of the system it is necessary to introduce electric energy accumulation devices able to cope with periods of lack of energy by the generators with the aim to get a system that needs as little as possible maintenance and can be efficiently supplied for a considerable period of time without the need of an external intervention.

Another consideration is that a part of these devices or systems require a minimum power in the most part of the time and powers of greater orders of magnitude for short instants of time. This occurs during the periods in which the system is in the step of transmission and then the involved powers increase even for short instants of time.

In this regard, the method 600 and related system 100 object of this invention may be conveniently used.

In fact, during the step of charging, or when the harvesting generator provides an electric power surplus not immediately used by the system, it is possible to choose among two charging methods.

In the case such electric power surplus is lower than a reference threshold, it proceeds firstly to charge said at least one capacitor (super-capacitor) until reaching of a respective maximum threshold (QE1) and subsequently of said at least one rechargeable battery 4 until reaching of a respective maximum threshold (QE2).

Contrary, in the case that electric power surplus is greater than a given reference threshold, it is possible to choose for the following charging methods:
- parallel charging both the electric energy accumulator devices (said at least one capacitor 3 and said at least one rechargeable battery 4), eventually with different charging percentages.
- parallel charging both accumulator devices (said at least one capacitor 3 and said at least one rechargeable battery 4), eventually with charging percentages depending on the charging level reached by one or the other electric energy accumulator devices or a combination of both;
- set charging priority to said at least one rechargeable battery as it needs of a minimum input electric current in order to be efficiently recharged;
- alternating the charge between the two accumulator devices, maybe with different duty-cycle;
- charging the one or the other electric energy accumulator devices (said at least one capacitor 3 and said at least one rechargeable battery 4) in relation to the charging level reached by one or the other or a combination thereof.

During the step of discharging, or when the harvesting generator does not provide enough electric energy to electrically supply the system 100, said at least one capacitor 3 (super-capacitor) will be assigned to provide all the electric energy requested by the system (load). Subsequently the reaching of a minimum threshold of electric charge of said at least on capacitor 3, the system (load) is electrically supplied by said at least one rechargeable battery 4.

This managing method of the electric energy shows the advantage that, in most cases, the electric energy accumulated in said at least one capacitor 3 (super-capacitor) is sufficient to meet the needs of electric supply of the system 100 assuming that the system has been dimensioned in a way that in most cases the harvesting generator is able to ensure the charge of said at least one capacitor. The electric energy of said at least one rechargeable battery 4 will be used only in those circumstances in which the harvesting generator is not able to provide sufficient electric energy for the periodic charge of said at least one capacitor 3 (for example, in case the solar panels that during enduring bad weather don't provide sufficient electric energy for the proper operation of the system).

Moreover, in some systems, the absorption of electric energy can greatly increase at certain instants of time, typically during the transmission of information by radio. In that case the change of power supply from said at least one capacitor 3 to said at least one rechargeable battery 4 should be done with reference threshold able to put aside an appropriate residual available charge in said at least one capacitor 3. This charge will be used to cope with the absorption peaks not handling by said at least one rechargeable battery 4 alone.

Use for Bright Markers

The so called bright markers are devices used for signaling or for decorative purpose (for example, bright elements for road signaling, pacer, bright tiles, streetlights).

Most of these devices are supplied by led due to their practical use, high light efficiency, reduced dimensions as long useful life.

These bright markers may be advantageously supplied by accumulators of electrical energy coming from solar panels or other electric supply sources (harvesting energy).

Depending on the availability of electric power provided by the solar panel the step of charging the device (load) will be performed in the same way shown for the use of wireless sensors.

During the step of discharging, the led device will be supplied by the electric energy stored in said at least one capacitor 3 until reaching of a lower reference threshold, while in the following will be supplied by the electric energy coming from said at least one rechargeable battery 4 (a chemical accumulator). The led bright marker can be designed to only use the electrical charge stored in said at least one capacitor 3, which can be dimensioned to store electric energy coming from a solar panel.

In case of insufficient charge due to low light (clouds, snow, and so on) the bright marker can be supplied by said at least one rechargeable battery.

It should be noted that the same methodology may be conveniently used to manage the electric energy accumulation in streetlights supplied by solar panels or other harvesting generators.

Use for Cars—Electric Vehicles

Currently electric vehicles supplied only by electric energy or hybrid (internal combustion engine and electric) use as source or primary electric energy source, chemical accumulators (in most of cases, Lithium accumulators, Lead, Ni—Cd or Vanadium). Super-capacitors are mostly used in combination to these last one to cope with electric current peak requested during acceleration and sometimes used for the recovery of the vehicle kinetic energy during braking. The choice of the accumulator is related to the capacity of the energy storage and currently falls on chemical batteries given their specific energy that is normally more than one order of magnitude compared to the super-capacitors. This entails increased autonomy and thus greater number of kilometers at full charge.

Except some prototypes for specific uses, there are not any cars that foreseen a supply exclusively by super-capacitors.

This is due to their low specific electric energy as well their higher cost in relation to an equal storable electric energy.

However there are advantages to supply a vehicle exclusively using super-capacitors: the first one is related to their useful life which, when measured both in number of charges/discharges as longevity, is several orders of magnitude higher; the second is the possibility to recharge them completely with times of lower orders of magnitude.

Therefore, according to the method and the system of the invention, it is possible to complement the traditional chemical accumulators with a set of super-capacitors with enough capacity to provide electric energy needed to the vehicle for traveling a fraction of the kilometers covered with the chemical accumulator. Supposing to combine a set of capacitors with a similar weight then to the set of chemical accumulators, it could travel currently about 10% of the autonomy provided by chemical batteries.

The reasons for that design solution, or to combine a number of super-capacitors able to supply the vehicle for a significant number of kilometers, is that in most of uses it does not travel the totality of the autonomy kilometers, much less.

The advantages are therefore:
drastic reduction of the number of charge/discharge of the chemical accumulator and therefore longer lifetime;
lower charging time.

During charging time two possible situations may occur: charging by high power recharging station, typical of public charging stations, in which the electric current that can be delivered is orders of magnitude greater than the one available in private homes, and recharging by household outlet where the electric availability is limited (generally not greater than ¾ Kw/h).

During the step of charging if the electric power availability is limited it is possible to give charging precedence to the super-capacitors so that if the vehicle is used before the fully charge of both accumulators (super-capacitors and chemical accumulators) it would use the super-capacitors, avoiding to discharge the chemical accumulators (batteries).

It should be noted that if the recharge was made through high power recharging station it would recharge in parallel both electric energy accumulators since the power is sufficient to provide the maximum electric power manageable by an adapting stage assigned to the control of the super-capacitors recharge and in the meantime by the control unit of the chemical accumulators recharge.

The method of the invention allows opting for a sequential recharge (super-capacitor-chemical accumulator) or a parallel recharge.

The device 1 of the system 100 can be used to supply transport systems of both people and objects.

The recharge of the accumulator system will be made depending on availability of the supply source and the expected charging time. For short recharging stops and if the availability of the source is not sufficient to recharge both accumulators, priority will be given to the super-capacitor recharge, after reaching the upper charging threshold, charging will be directed to the chemical accumulator.

During the step of discharging, i.e. during the use of the vehicle, the super-capacitors would provide the required energy until the charging level does not reach a minimum threshold retaining a residual charge. The residual charge will be used in parallel to the energy supplied by the chemical accumulator to cope with absorption peaks due for example to the acceleration phases of the vehicle.

Once the charging level reaches this minimum threshold the vehicle will be supplied by chemical batteries with the eventual aid of said residual super-capacitors energy.

To periodically restore such super-capacitor residual energy allocated to cope with the absorption peaks, the chemical accumulator will recharge this amount of energy during periods in which the load does not absorb the maximum current that can be delivered by the chemical accumulator. The amount of residual energy of the super-capacitor to be allocated for the absorption peaks can be calculated as the energy surplus required to the vehicle needed to accelerate (assuming to move from a certain speed to a higher one in a reasonable amount of time). Reserving a higher energy amount has the advantage to cope with greater acceleration but reduces the energy amount available for exclusive super-capacitors supply.

Figure 8:
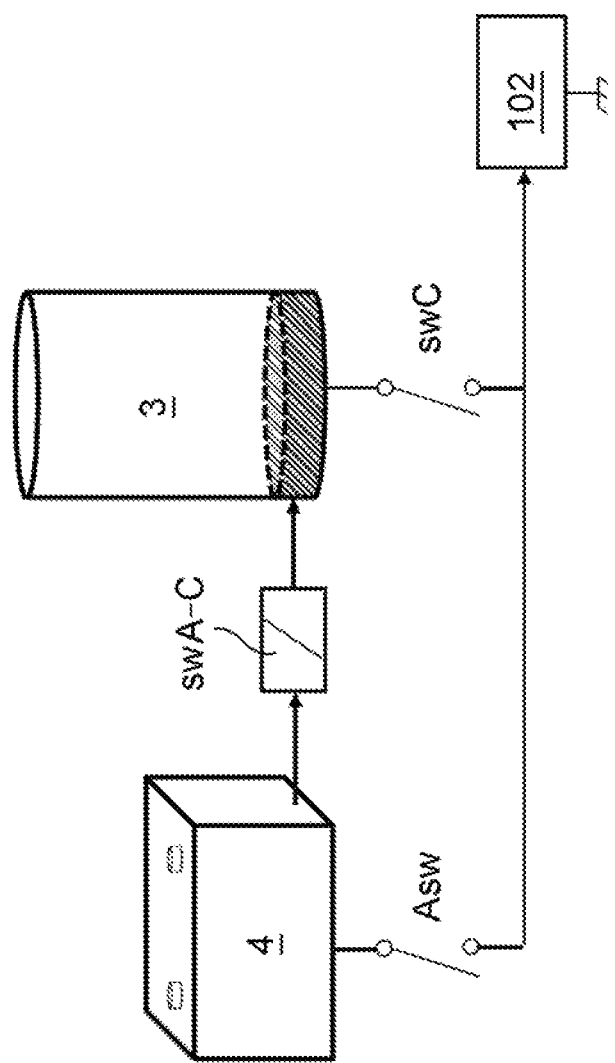
FIGS. 8-10 schematically show the system for transferring electric energy from an electric energy source to a load, according to some examples of application, and FIGS. 11*a*-11*b* schematically show a system for transferring electric energy from an electrical energy source to a load, according to an additional embodiment of the invention.

With reference to the FIG. 8, in the step of recharging, the load 102 will be supplied by the chemical accumulator 4 through an electric switch Asw. During absorption peaks the residual energy in the super-capacitor 3 will provide the electric energy surplus to the load 102 through an additional electric switch swC whereby the chemical accumulator 4 is not able to provide.

The chemical accumulator 4 may recharge the super-capacitor 3 of the electric energy amount allocated to cope with the load absorption peaks by a further electric unidirectional switch swA-C.

In the case the load 102 produces electric energy (as in the case of electric energy recovery during braking), the electric energy produced will be stored in the super capacitor 3 through the additional electric switch swC and in case the electric energy generated by the load 102 was above the maximum management capacity of the control unit 5 of the super-capacitor recharging, the surplus will be directed to the chemical accumulator 4 through the electric switch Asw or alternatively not recovered.

Depending on the configuration of the electronic control unit 5 of the electric switches (schematically shown in FIG. 8) they can be represented by both passive elements as active circuits. In the last case they may be for example represented by transistors in MOS technology, unidirectional or bidirectional dc/dc converters and combinations among them.

Use for Power Tools/Appliances

The method of the invention can be used to manage the charge and discharge of electric tools and cordless appliances.

In these devices there is the problem of the limited number of charges/discharges that is possible to do, related to the chemical batteries technology.

Depending on the model the number of fully charges/discharges is in the order of few hundreds.

By combining a set of super-capacitors able to hold a fraction of the energy capacity of chemical batteries it may decrease the number of charge/discharge of the last ones. It is reasonably conceivable that most uses don't exploit the full energy autonomy but only a small fraction of it before they are put back on charge again.

Moreover, the presence of super-capacitors can be convenient also to cope with absorption peak typical of stress situations.

Also in this case depending on the availability of the supply system it is possible to decide to fully charge the super-capacitor and subsequently the chemical battery or charging both simultaneously. In cordless power tools and appliances that involve the electric electricity recovery from moving or rotating masses, that electric energy will be stored in the super-capacitor as described in the previous paragraph.

Use in Stand-Alone/Grid-Support Systems Based on Solar Panel/Wind Generators

The energy accumulation systems (energy harvesting) for electric energy production for local use or to be connected to the electric network are mainly based on wind generators or solar panels. To be interconnected with the electric grid or directly provide energy to the end user is necessary to adapt the output of such generators in order to be compatible with specific voltage values, frequency and phase of the electricity network.

This conversion is done through active converters that transform the electric voltage from generators into electric voltage required by the end user or the network, both in terms of voltage, frequency and phase.

In stand-alone systems it is particularly needed to level the energy fluctuations due to changes in solar irradiation or wind speed. In order to ensure the output values of electric voltage it is necessary to introduce an element of electric energy accumulation in order to cope with the input variations.

A possible use of the method and the system in accordance with the present invention, has the advantage of extending the useful life of the chemical accumulators (Lead batteries, Lithium or other).

Figure 9:
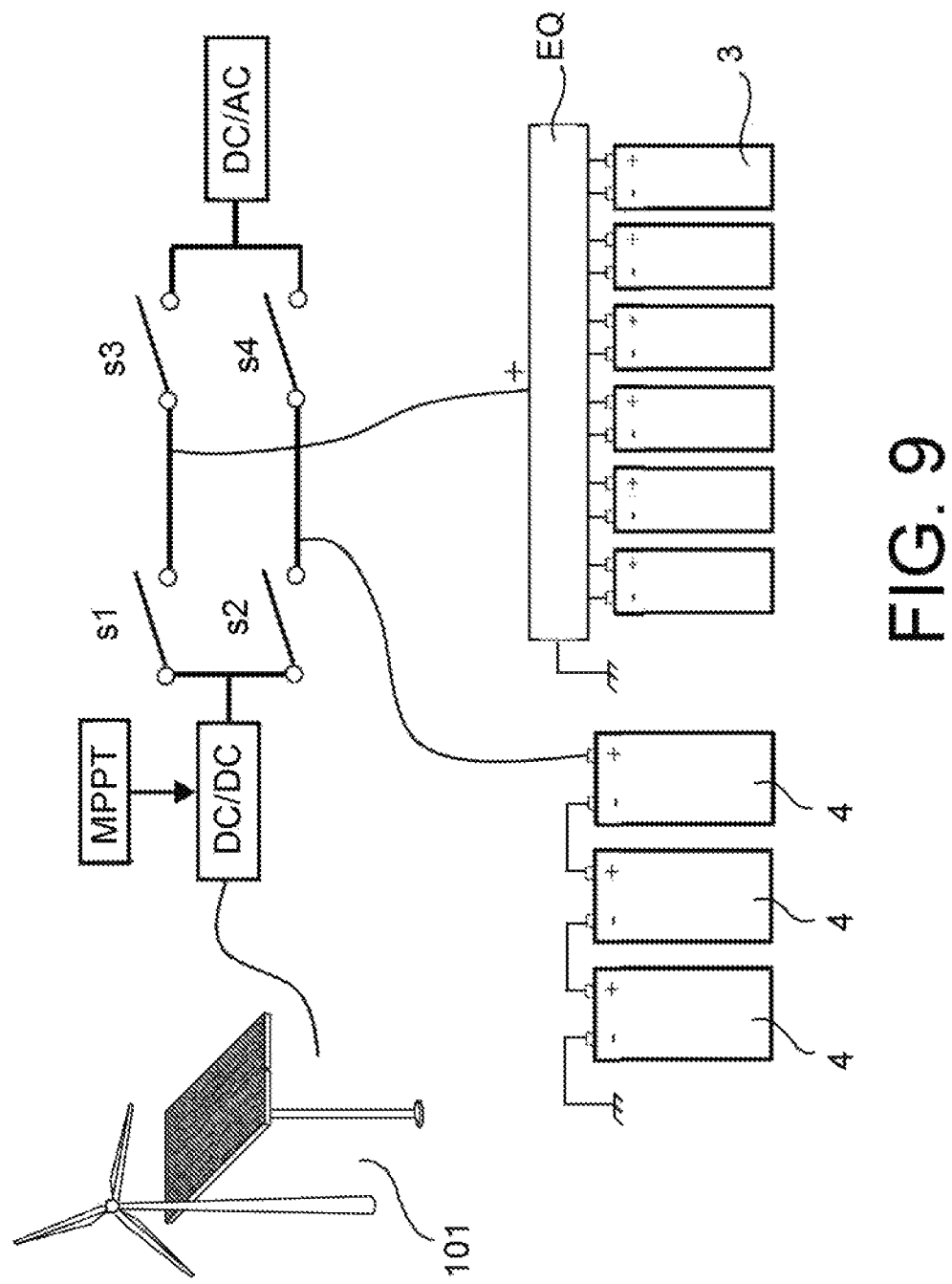

In FIG. 9 is shown a scheme of a system for transferring electric energy from an electric energy source 101 (solar panel or wind turbines) to a load (not shown).

The value of electric voltage at the output of the generators is adapted to the electric voltage value for charging one of the two accumulation devices (chemical accumulator 4 or super-capacitors 3) through a DC/DC converter provided with a MPPT. Being harvesting generators, it is useful to provide a MPPT (Maximum Power Point Tracker) module that maximizes the efficiency by operating them in the best operating point in every irradiation condition or wind speed. If in input an alternating electric voltage as the one generated by the wind turbines alternator was applied it will be used as input an AC/DC converter. The output draws the voltage from one of the two accumulators transforming it into the required value (nominal network value) via a DC/AC converter.

The charging and discharging steps are regulated with the same modalities previously seen.

Starting from an initial situation in which both accumulators are discharged the solar panel (would be similar considering the wind turbine) recharges first the super-capacitor 3 through the DC/DC converter until reaching a maximum charging threshold. This is achieved by closing the further electric switch s1 and leaving open the further electric switch s2. After reaching the maximum charge threshold it proceeds to charge the chemical accumulator opening the further switch s1 and closing the further switch s2. It is to take into account that if during the chemical accumulator recharge the super-capacitor 3 would discharge and then the charging level would decrease below the maximum charge threshold, the solar panel 101 would return to recharge the super capacitor 3 until the maximum charge threshold opening the further switch s2 and closing the further switch s1.

It should be noted that the discharge of the super-capacitors 3 may happen through absorption by the load. The discharge may be simultaneous to the step of charging.

During the step of discharging the DC/AC converter will get the required energy first from the super-capacitor 3 until reaching a minimum charging threshold closing the further electric switch s3 and opening the further electrical switch s4.

After reaching the minimum charge threshold the DC/AC converter will get the energy required from the chemical accumulator opening the further electric switch s3 and closing the further electric switch s4.

In order to enhance the efficiency the conversion "harvesting generator"-"accumulator" and "accumulator"-"network voltage" (load) is advisable to minimize voltage steps between the two conversions. In other words it is necessary to ensure that the working voltages of the accumulators are close to those of the harvesting generators or the nominal output voltage.

The simplest solution provides to connect in series both chemical accumulators 4 and the super-capacitors 3 (FIG. 10) in order to increase the nominal voltage.

If the series connection of the chemical accumulators 4 doesn't introduce special issues, different is the approach to the series connection of super-capacitors 3. Without appropriate precaution the series connection can entail voltage differences across the super-capacitors due to little deviations from the nominal capacity values. Such deviations resulting from both manufacturing tolerances and temporary variations due to charges repositioning phenomena within the single capacitor, lead to electric voltage variation at the terminals with possible failures or shortened useful life.

To remedy this inconvenience is therefore opportune, or necessary, to introduce an equalization stage EQ that maintain equal the voltage among the several series super-capacitors. Examples of equalization stages EQ are: dissipative networks; balancing by transformer/inductor; capacitive balancing; via DC/DC converters.

To this scheme it is possible to add an improvement letting that a portion of the residual energy of the super-capacitor 3 can be used in parallel to the chemical accumulator 4 to cope with load absorption peaks. This is useful in order to conveniently reduce electric stress of the chemical accumulators during absorption peaks.

Figure 10:
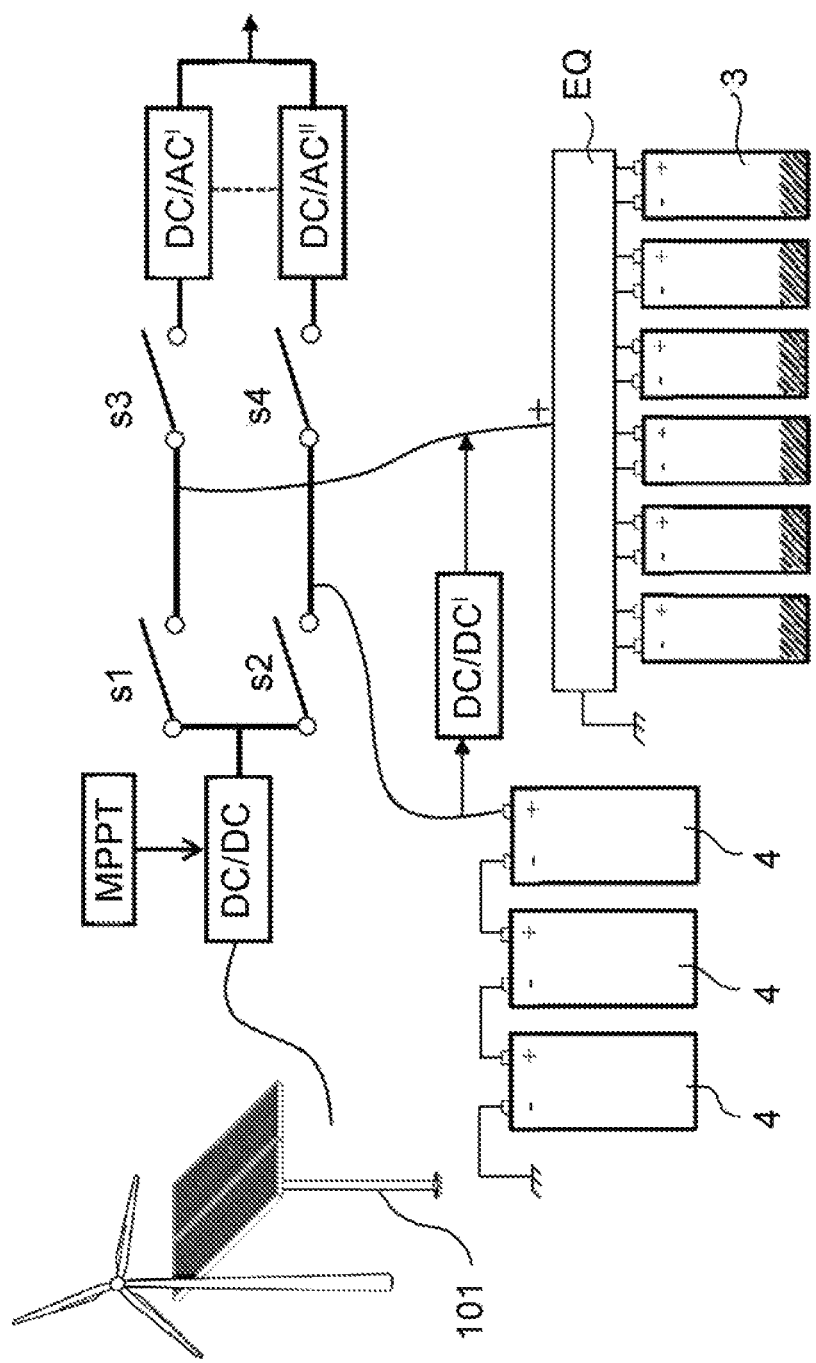

The scheme shown in FIG. 10 includes that possibility.

During the step of discharging in which the load is supplied by the chemical accumulator 4, if the absorption exceeds a given threshold the super-capacitor 3 may use the allocated residual charge to provide the energy surplus. In this case the DC/AC' converter downstream the further electrical switch s3 will operate providing current in parallel with that in output of the DC/AC" converter downstream of the further electrical switch s4. It is necessary to provide a synchronism between the two converters DC/AC' and DC/AC" in order that the output voltage shows the same phase.

In the scheme this synchronism is highlighted by the dotted line that joins the two converters DC/AC' and DC/AC".

In the moments when the chemical accumulator 4 doesn't provide the maximum current that can be delivered it may recharge the super-capacitors 3 for that portion of allocated residual charge to cope with the absorption peaks. This recharge may be done for example through the converter DC/DC' downstream the chemical accumulators 4 and upstream the equalization stage EQ of the super-capacitors 3.

When the energy of the super-capacitor 3 allocated for absorption peaks decreases, the chemical accumulator 4 may provide for its recharge.

As it can be seen the object of the present invention is achieved because the method and the related system overcome the drawbacks of the described known art, as illustrated in the present description in which are also highlighted the advantages of the invention.

A person skilled in the art may make modifications and variations to the embodiments of the method, the device and the related system described above, replacing elements with others functionally equivalent so as to satisfy contingent requirements while remaining within the sphere of protection of the following claims. Each of the characteristics described as belonging to a possible embodiment may be realized independently of the other embodiments described.

The invention claimed is:

1. A method for transferring electric energy from an electric energy source to a load by using a plurality of electric energy accumulators interposed between the electric energy source and the load, said plurality of electric energy accumulators comprising at least one capacitor and at least one rechargeable battery, the method comprising steps of:

detecting, by a control unit, a value representative of the electric energy amount that can be delivered by the electric energy source;

comparing, by the control unit, the detected value representative of the electric energy amount that can be delivered by the electric energy source with a set first electric energy amount reference value;

in the case that the detected value representative of the electric energy amount delivered by the electric energy source is lower than said set first electric energy amount reference value:

enabling, by the control unit, a first charging electric connection between the electric energy source and said at least one capacitor;

delivering electric energy to said at least one capacitor until reaching a set first electric energy charge value;

once the electric energy accumulated by said at least one capacitor reaches the set first electric energy charge value:

disabling, by the control unit, the first charging electric connection;

enabling a second charging electric connection between the electric energy source and said at least one rechargeable battery;

transferring electric energy to said at least one rechargeable battery until reaching a set second electric energy charge value;

in the case that the detected value representative of the electric energy amount that can be delivered by the electric energy source is greater than said set first electric energy amount reference value:

enabling, by the control unit, the first charging electric connection between the electric energy source and said at least one capacitor and/or the second charging electric connection between the electric energy source and said at least one rechargeable battery;

transferring electric energy, respectively, to said at least one capacitor until reaching the set first electric energy charge value and/or to said at least one rechargeable battery until reaching a set second electric energy charge value;

comparing, by the control unit, the charging level of said at least one capacitor with a set first reference threshold value;

in the case that said charging level of said at least one capacitor is greater than said set first reference threshold value:

enabling, by the control unit, a first discharging electric connection between said at least one capacitor and said load;

transferring electric energy from said at least one capacitor to the load until the charging level of said at least one capacitor is greater than said set first reference threshold value;

in the case that the charging level of said at least one capacitor has reached the set first reference threshold value:

disabling, by the control unit, the first discharging electric connection;

enabling, by the control unit, a second discharging electric connection between said at least one rechargeable battery and the load;

transferring electric energy from said at least one rechargeable battery to the load until the charging level of said at least one rechargeable battery is greater than said set second reference threshold value.

2. The method according to claim 1, wherein the set first electric energy amount reference value is as a function of at least one set first electric energy amount threshold value.

3. The method according to claim 1, wherein the set first electric energy amount reference value is further as a function of a set second electric energy amount threshold value that can be managed by an adaptation stage intended to charge said at least one capacitor.

4. The method according to claim 1, wherein the set first electric energy amount reference value is further as a function of a set electric charge threshold value of said at least one capacitor.

5. The method according to claim 1, in the case that the detected value representative of the amount of electric energy that can be delivered by the electric energy source is lower than said set first electric energy amount reference value and is greater than said second set second electric energy amount threshold value for charging said at least one capacitor, comprising:

providing, by the control unit, at least one electric energy amount excess part to said at least one rechargeable battery.

6. The method according to claim 1, wherein the detected value representative of the electric energy amount that can be delivered by the electric energy source is greater than the set first electric energy amount reference value, comprising steps of:

enabling, by the control unit, the first charging electric connection between the electric energy source and said at least one capacitor and the second charging electric connection between the electric energy source and said at least one rechargeable battery;

transferring, by the control unit, electric energy, respectively, to said at least one capacitor until reaching the set first electric energy charge value and to said at least one rechargeable battery until reaching the set second electric energy charge value.

7. The method according to claim 6, wherein the step of transferring electric energy to said at least one capacitor and to said at least one rechargeable battery comprises a step of distributing, by the control unit, the energy delivered by the electric energy source in equal or different parts between said at least one capacitor and said at least one rechargeable battery, as a function of the charging status of said at least one capacitor or said at least one rechargeable battery or a combination thereof.

8. The method according to claim 1, in the case that the detected value representative of the electric energy amount that can be delivered by the electric energy source is greater than said set first electric energy amount reference value, comprising steps of:

enabling, by the control unit, the second charging electric connection between the electric energy source and said at least one rechargeable battery;

transferring electric energy to said at least one rechargeable battery until reaching a set second electric energy charge value;

subsequently, enabling, by the control unit, the first charging electric connection between the electric energy source and said at least one capacitor;

transferring, by the control unit, electric energy to said at least one capacitor until reaching a set first electric energy charge value.

9. The method according to claim 1, in the case that the detected value representative of the electric energy amount that can be delivered by the electric energy source is greater than said set first electric energy amount reference value, comprising step of:

enabling, by the control unit, the first charging electric connection between the electric energy source and said at least one capacitor or the second charging electric connection between the electric energy source and said at least one rechargeable battery;

transferring in an alternated manner, by the control unit, electric energy, respectively, to said at least one capacitor until reaching a set first electric energy charge value or to said at least one rechargeable battery until reaching a set second electric energy charge value, as a function of a set equal or different temporization.

10. The method according to claim 9, further comprising the step of establishing, by the control unit, the set temporization as a function of the charging status of said at least one capacitor or said at least one rechargeable battery or a combination thereof.

11. The method according to claim 7, wherein the step of transferring electric energy to said at least one capacitor or to said at least one rechargeable battery further comprises a step of transferring, by the control unit, all the delivered electric energy of the electric energy source to said at least one capacitor or to said at least one rechargeable battery as a function of the charging status of said at least one capacitor or said at least one rechargeable battery or a combination thereof.

12. The method according to claim 1, further comprising a step of detecting, by the control unit, the time duration of the availability of electric energy provided by the electric source.

13. The method according to claim 1, in the case that the electric energy is transferred from said at least one rechargeable battery to said load and the load has electric energy absorbing transients exceeding an amount of electric energy that can be delivered by said at least one rechargeable battery, comprising steps of:
enabling, by the control unit, the first discharging electric connection of said at least one capacitor between said at least one capacitor and said load;
transferring from said at least one capacitor to said load a set amount of reserve electric energy previously stored in said at least one capacitor.

14. The method according to claim 13, in the case that the set amount of reserve electric energy previously stored in said at least one capacitor which is transferred to said load is consumed, comprising steps of:
enabling, by the control unit, a third charging electric connection of said at least one capacitor between said at least one rechargeable battery and said at least one capacitor;
transferring electric energy from said at least one rechargeable battery to said at least one capacitor until reaching said set amount of reserve electric energy previously stored in said at least one capacitor.

15. The method according to claim 1, comprising steps of:
detecting, by the control unit, the electric energy that can be dissipated by the load;
enabling, by the control unit, a fourth charging electric connection of said at least one capacitor between said load and said at least one capacitor;
transferring, by the control unit, said electric energy that can be dissipated by the load from said load to said at least one capacitor.

16. A device for transferring electric energy from an electric energy source to a load, comprising:
a plurality of electric energy accumulators suitable to be interposed between the electric energy source and the load, said plurality of electric energy accumulators comprising at least one capacitor and at least one rechargeable battery;
a first charging electric connection of said at least one capacitor suitable to connect said at least one capacitor to the electric energy source;
a second charging electric connection of said at least one rechargeable battery suitable to connect said at least one rechargeable battery to the electric energy source;
a first discharging electric connection of said at least one capacitor suitable to connect said at least one capacitor to the load;
a second discharging electric connection of said at least one rechargeable battery suitable to connect said at least one rechargeable battery to the load;
a control unit operatively connected to said at least one capacitor, said at least one rechargeable battery, said first charging electric connection, said second charging connection, said first discharging connection, said second discharging electric connection, said control unit being suitable to be operatively connected to the electric energy source, said control unit being configured to:
detect a value representative of the electric energy amount that can be delivered by the electric energy source;
compare the detected value representative of the electric energy amount that can be delivered by the electric energy source with a set first electric energy amount reference value;
in the case that the detected value representative of the electric energy amount delivered by the electric energy source is lower than said set first electric energy amount reference value:
enable a first charging electric connection between the electric energy source and said at least one capacitor;
delivery electric energy to said at least one capacitor until reaching a set first electric energy charge value;
once the electric energy accumulated by said at least one capacitor reaches the set first electric energy charge value:
disable the first charging electric connection;
enable a second charging electric connection between the electric energy source and said at least one rechargeable battery;
transfer electric energy to said at least one rechargeable battery until reaching a set second electric energy charge value;
in the case that the detected value representative of the electric energy amount that can be delivered by the electric energy source is greater than said set first electric energy amount reference value:
enable the first charging electric connection between the electric energy source and said at least one capacitor and/or the second charging electric connection between the electric energy source and said at least one rechargeable battery;
transfer electric energy, respectively, to said at least one capacitor until reaching the set first electric energy charge value and/or to said at least one rechargeable battery until reaching a set second electric energy charge value;
compare the charging level of said at least one capacitor with a set first reference threshold value;
in the case that said charging level of said at least one capacitor is greater than said set first reference threshold value:
enable a first discharging electric connection between said at least one capacitor and said load;

transfer electric energy from said at least one capacitor to the load until the charging level of said at least one capacitor is greater than said set first reference threshold value;

in the case that the charging level of said at least one capacitor has reached the set first reference threshold value:

disable the first discharging electric connection;

enable a second discharging electric connection between said at least one rechargeable battery and the load;

transfer electric energy from said at least one rechargeable battery to the load until the charging level of said at least one rechargeable battery is greater than said set second reference threshold value.

17. A system for transferring electric energy from an electric energy source to a load to be electrically supplied, comprising:

an electric energy source;

a load;

a device in accordance with claim 16, operatively connected to the electric energy source and the load.

18. A program product, that can be loaded in a memory unit of an electric calculator and executable by a control unit to:

detect a value representative of the electric energy amount that can be delivered by the electric energy source;

compare the detected value representative of the electric energy amount that can be delivered by the electric energy source with a set first electric energy amount reference value;

in the case that the detected value representative of the electric energy amount delivered by the electric energy source is lower than said set first electric energy amount reference value:

enable a first charging electric connection between the electric energy source and said at least one capacitor;

delivery electric energy to said at least one capacitor until reaching a set first electric energy charge value;

once the electric energy accumulated by said at least one capacitor reaches the set first electric energy charge value:

disable the first charging electric connection;

enable a second charging electric connection between the electric energy source and said at least one rechargeable battery;

transfer electric energy to said at least one rechargeable battery until reaching a set second electric energy charge value;

in the case that the detected value representative of the electric energy amount that can be delivered by the electric energy source is greater than said set first electric energy amount reference value:

enable the first charging electric connection between the electric energy source and said at least one capacitor and/or the second charging electric connection between the electric energy source and said at least one rechargeable battery;

transfer electric energy, respectively, to said at least one capacitor until reaching the set first electric energy charge value and/or to said at least one rechargeable battery until reaching a set second electric energy charge value;

compare the charging level of said at least one capacitor with a set first reference threshold value;

in the case that said charging level of said at least one capacitor is greater than said set first reference threshold value:

enable a first discharging electric connection between said at least one capacitor and said load;

transfer electric energy from said at least one capacitor to the load until the charging level of said at least one capacitor is greater than said set first reference threshold value;

in the case that the charging level of said at least one capacitor has reached the set first reference threshold value:

disable the first discharging electric connection;

enable a second discharging electric connection between said at least one rechargeable battery and the load;

transfer electric energy from said at least one rechargeable battery to the load until the charging level of said at least one rechargeable battery is greater than said set second reference threshold value.

* * * * *